Patented June 13, 1944

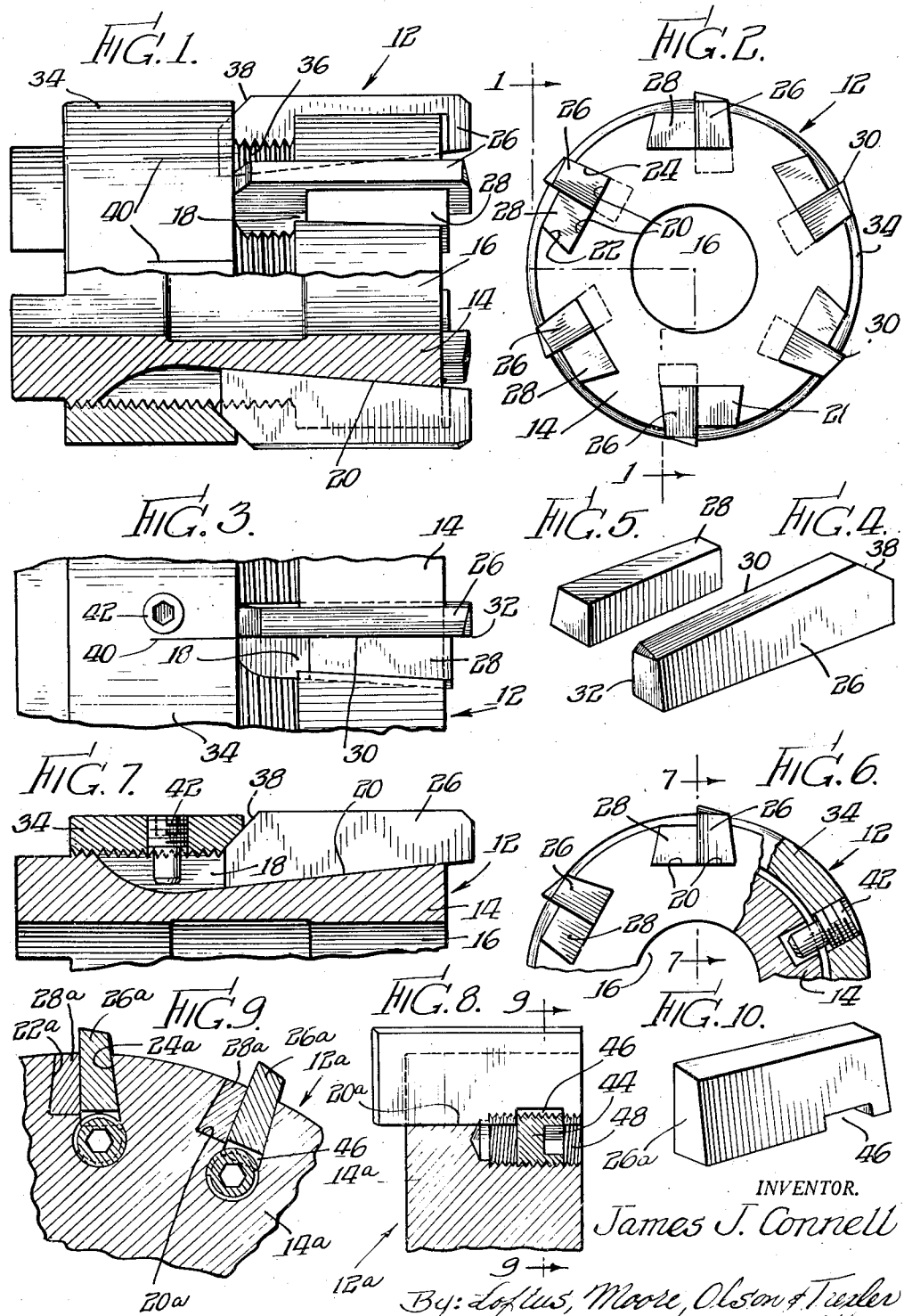

2,351,491

UNITED STATES PATENT OFFICE 2,351,491

INSERTED TOOTH CUTTER

James J. Connell, Chicago, Ill.

Application March 10, 1943, Serial No. 478,601

4 Claims. (Cl. 29—105)

This invention relates generally to rotary cutting tools and more particularly to rotary cutting tools of the inserted tooth type in which the inserted teeth are capable of both radial and axial adjustment.

The present invention contemplates an inserted tooth cutter having improved structural characteristics which facilitate both radial and axial adjustment of the blades and which will insure firm fitting of the blades within their respective slots.

More specifically, the invention contemplates a cutter of the type set forth above wherein the blades and the recesses in the cutter body for holding the blades are so tapered as to positively secure the blades against loosening under the severest operating conditions.

Still more specifically the present invention contemplates a cutter having a novel tapered form of blade in combination with a tapered wedge adapted to be axially driven into position so as to positively secure a complementary tooth or blade in its proper position of adjustment.

It is also an important object of the present invention to provide a cutting tool of the type set forth above which is particularly adapted to function as a reamer.

The foregoing and other objects and advantages will be more apparent from the following detailed description when considered in connection with the accompanying drawing, wherein—

Fig. 1 is a side elevational view of a cutting tool or reamer embodying structural features contemplated by the present invention, the front lower half of the cutter being broken away to more clearly illustrate the manner in which the blades are adjustably positioned within the cutter body, said view being taken substantially along the line 1—1 of Fig. 2;

Fig. 2 is an end elevational view as seen from the right extremity of the cutter in Fig. 1;

Fig. 3 is a fragmentary plan view of the cutter shown in Fig. 1;

Fig. 4 is a perspective view of one of the cutter blades or teeth shown in the cutter of Figs. 1 to 3, inclusive;

Fig. 5 is a perspective view of one of the wedges employed to secure a companion blade against loosening;

Fig. 6 is a fragmentary end elevational view shown partly in section of the cutter of Fig. 2 equipped with a set screw for securing the blade adjusting collar in various positions of adjustment;

Fig. 7 is a fragmentary vertical sectional view taken substantially along the line 7—7 of Fig. 6;

Fig. 8 is a fragmentary sectional view taken axially of the cutter body of slightly modified form equipped with an axially movable adjusting screw for adjusting the axial positioning of the blades;

Fig. 9 is a fragmentary sectional view taken substantially along the line 9—9 of Fig. 8; and Fig. 10 is a perspective view of one of the inserted cutting blades of the cutter shown in Figs. 8 and 9.

Referring now to the drawing more in detail wherein like numerals have been employed to designate similar parts throughout the various figures, it will be seen that one embodiment of the invention is incorporated in an inserted tooth cutter or reamer designated generally by the numeral 12, Figs. 1 to 7, inclusive. This rotary cutter 12 includes a cutter body 14 having a central aperture 16 to accommodate a suitable supporting arbor or tool holder (not shown). The body 14 is formed with a plurality of axially extending recesses or slots 18 which are defined by a bottom wall or surface 20 and oppositely disposed side surfaces or walls 22 and 24. It will be noted that the side walls 22 and 24 converge both radially and axially. That is to say, these walls slope toward each other in an outward radial direction as well as axially inward from the front or right extremity as viewed in Figs. 1, 3 and 7. The walls 24 extend in parallelism with the cutter axis whereas the plane of the wall 22 is inclined with respect to the cutter axis. These recesses or slots 18 are preferably formed in the cutter body by a simple milling operation.

Each of the cutter slots 18 just described is designed to accommodate a cutting blade or tooth 26 and a companion blade locking wedge member 28. The side walls of each blade 26 and companion wedge member 28 converge radially, as clearly illustrated in Figs. 2 and 6, in conformity with the radial convergence of the walls 22 and 24 of the recesses 18. The side walls of the wedge member converge axially, as clearly illustrated in Fig. 3, but the side walls of the cutter blades 26 do not converge axially. That is to say, while the side walls of the blades 26 converge radially they do not converge axially. On the other hand, the side walls of the wedge members 28 converge both radially and axially. Each of the blades 26 presents an axial cutting edge 30 and an end or radially disposed cutting edge 32. The side wall of each blade 26 which intersects with the top and end surfaces of the blade to present the axial cutting edge 30 and the end or radial cutting edge 32 preferably lies in a plane which is coincident with the cutter axis. In this manner the cutting edges of the blades 26 are positioned for most efficient cutting action.

Particular attention is also directed to the fact that the section of the bottom surface or wall 20 of each recess 18 adjacent each blade is inclined with respect to the cutter axis. Correspondingly, the inner wall or edge of each blade 26 when mounted in the cutter, as clearly illustrated in Figs. 1 and 7, is inclined to the cutter axis while the outer edge or surface of each blade extends in parallelism with the cutter axis. This arrangement enables radial adjustment of the blades. As the blades are shifted axially forward or to the right, Figs. 1, 3 and 7, the cutting edges 30 thereof are adjusted radially outward and the cutting edges 32 are shifted axially to the right.

The blades 26 may be simultaneously moved into the desired position of adjustment after loosening of the wedge members 28 by means of an adjustable collar 34. This collar is internally threaded and adapted to be received by a threaded portion 36 of the body 14. The forward edge of the collar 34 is undercut, as illustrated in Fig. 7, so as to bear against a complementary inclined surface 38 of each blade 26. This arrangement counteracts the tendency for the blades 26 to move radially outward in the vicinity of the adjusting collar. Thus, as the collar 34 is turned against the surfaces 38 of the blades 26, it exerts pressure both axially and inwardly. The collar 34 may be provided with suitable graduations 40 to facilitate axial adjustment of the blades.

From the foregoing it will be apparent that when blades are to be initially mounted within the cutter body they are placed in the recesses 18 and a companion wedge member 28 is inserted axially from the right or forward end of the cutter body. Before the wedges are finally tightened in place, the collar 34 is positioned against the surfaces 38 of the blades and the blades are radially adjusted to conform with the aperture which is to be reamed. After the blades have been radially adjusted to provide the required cutter diameter, the wedges 28 are securely driven into position. As the wedge members 28 are driven inwardly the radial convergence of the walls 22 and 24 cooperates to urge both the blade and companion wedge member firmly against the bottom of the cutter slot. Likewise, the surfaces of the blade and wedge member complementary to the slot walls 22 and 24 are firmly tightened against said walls. In this manner the blades are firmly secured in their desired position of adjustment. To loosen the blades it is only necessary to apply a blow to the inner end of each wedge member so as to drive it to the right out of locking contact with its companion blade.

In instances where it is desired to secure the collar 34 in various positions of adjustment, a suitable set screw 42 may be employed. This set screw has a reduced inner extremity which is accommodated by the inner extension of the slot 18, as clearly illustrated in Figs. 6 and 7. In this vicinity the slot 18 has a width which is just sufficient to conveniently accommodate the set screw shank.

In Figs. 8 and 9 a milling cutter equipped with a slightly modified form of cutter blade adjustment is disclosed. The milling cutter of Figs. 8 and 9 is designated generally by the numeral 12a and includes a rotary cutter body 14a. The periphery of the body 14a is provided with cutter receiving slots having side walls 22a and 24a which correspond in disposition to the side walls 22 and 24 previously described. That is to say, the side walls 22a and 24a converge radially outward and also converge axially from one side of the milling cutter body 14a to the other. The side walls of the wedge member 28a converge axially, similarly to the wedge member 28, whereas the side walls of the cutter blade 26a, similarly to the blades 26, only converge radially outward. A cutter blade 26a and wedge member 28a are mounted within the cutter body, similarly to the blades 26 and wedge members 28 previously described. Instead of employing an adjustable collar such as the collar 34 shown in Figs. 1, 3 and 7 an adjustable screw member 44 is associated with the inner edge of each blade. Each of the blades 26a is cut away or recessed at 46 to accommodate the outer periphery of the screw member 44. The screw member 44 is received by a threaded aperture 48 provided in the cutter body 14a. Thus, to axially adjust the cutter blade 26a it is only necessary to loosen the wedge member 22a and rotate the screw member 44. It will be noted that the slot and blade construction of the cutter 12a differs from the slot and blade construction disclosed in the previously described reamer 12 in that no radial adjustment of the blades 26a is accomplished. Thus, the bottom wall or surface 20a of each of the slots in the cutter 12a is substantially parallel with the cutter axis, as distinguished from the disposition of the bottom wall 20 of the cutter 12.

In the cutter 12 the bottom surface or wall of the recess 18 adjacent the under side of its companion wedge member 28 is parallel with the cutter axis. Likewise, the bottom surface of the wedge member 28 when lodged within its companion recess 18 extends in substantial parallelism with the cutter axis and frictionally engages the bottom surface or wall of the recess.

From the foregoing description it will be apparent that the present invention contemplates an inserted tooth cutter of extremely practical and simple form. All of the constituent parts of the cutter may be produced by the practice of conventional machine shop methods and hence the cutter may be very economically manufactured. The novel arrangement of the slots and cutter blades, coupled with the other features of construction, presents a cutter in which the blades may not only be very conveniently adjusted but also positively secured against loosening within the cutter body.

Obviously the invention is not limited to the specific structural features disclosed herein but is capable of other changes and modifications without departing from the spirit and scope of the appended claims.

The invention is hereby claimed as follows:

1. An inserted tooth cutter comprising a rotary cutter body having a plurality of peripheral axially extending recesses, each of said recesses being defined by side walls converging radially outward and axially inward from one extremity of the cutter body, a plurality of blades, one associated with each of said recesses and each having side walls which converge radially outward, a plurality of wedge members, one associated with each blade in each recess, for securing each blade in position and each member having side walls converging radially outward and axially in conformity with the associated recess, and rotary means for longitudinally adjusting each blade axially with respect to the cutter body.

2. An inserted tooth cutter comprising a rotary cutter body having a plurality of peripheral axially extending recesses, each of said recesses being defined by side walls converging radially outward and axially inward from one extremity of the cutter body, a plurality of blades, one associated with each of said recesses and each having side walls which converge radially outward and a bottom surface inclined toward the cutter axis, a plurality of wedge members, one associated with each blade in each recess, for securing each blade in position and each member having side walls converging radially outward and axially in conformity with the associated recess, the bottom wall of each recess adjacent the inner surface of its associated blade being inclined inwardly whereby to effect radial adjustment of the blade in response to axial shifting thereof and blade locking means engaging each blade and adjustable axially of the cutter body to effect axial shifting of the blades.

3. An inserted tooth cutter comprising a rotary cutter body having a plurality of peripheral axially extending recesses, each of said recesses being defined by side walls converging radially outward and axially inward from one extremity of the cutter body, a plurality of blades, one associated with each of said recesses and each having side walls which converge radially outward and a bottom surface inclined toward the cutter axis, a plurality of wedge members, one associated with each blade in each recess, for securing each blade in position and each member having side walls converging radially outward and axially in conformity with its companion recess, the portion of the bottom wall of each recess adjacent the inner surface of its associated blade being inclined inwardly and the portion of the bottom wall of each recess adjacent the inner surface of its associated wedge member extending in substantial parallelism with the cutter axis, and blade locking means engaging said blades and mounted on the cutter body for axial adjustment to effect thereby radial and axial adjustment of the blades.

4. An inserted tooth cutter comprising a rotary cutter body having a plurality of peripheral axially extending recesses, each of said recesses being defined by side walls converging radially outward and axially inward from one extremity of the cutter body, a plurality of blades, one associated with each of said recesses and each having side walls which converge radially outward, a plurality of wedge members, one associated with each blade in each recess, for securing each blade in position and each member having side walls converging radially outward and axially in conformity with the associated recess, each blade having a recess in its lower edge, and a plurality of rotary adjustment means, one for each of said blades and each mounted in the cutter body adjacent a recess therein and interlocking with the recess in the associated blade for longitudinally adjusting said blade axially of the cutter body.

JAMES J. CONNELL.